(12) United States Patent
Gou

(10) Patent No.: US 11,759,878 B2
(45) Date of Patent: Sep. 19, 2023

(54) SOLDERING IRON DEVICE

(71) Applicant: Qian Gou, Guangdong (CN)

(72) Inventor: Qian Gou, Guangdong (CN)

( * ) Notice: Subject to any disclaimer, the term of this patent is extended or adjusted under 35 U.S.C. 154(b) by 10 days.

(21) Appl. No.: 17/564,287

(22) Filed: Dec. 29, 2021

(65) Prior Publication Data

US 2023/0070160 A1 Mar. 9, 2023

(30) Foreign Application Priority Data

Sep. 3, 2021 (CN) ......................... 202122128737.X

(51) Int. Cl.
  *B23K 3/00* (2006.01)
  *B23K 3/02* (2006.01)
  *B23K 3/08* (2006.01)

(52) U.S. Cl.
  CPC . *B23K 3/02* (2013.01); *B23K 3/08* (2013.01)

(58) Field of Classification Search
  CPC ........................... B23K 3/02–026; B23K 3/08
  USPC ...................................... 228/51–55
  See application file for complete search history.

(56) References Cited

U.S. PATENT DOCUMENTS

| | | | | |
|---|---|---|---|---|
| 3,646,577 A | * | 2/1972 | Ernst ................... | G05D 23/1909 219/505 |
| 4,468,555 A | * | 8/1984 | Adachi .................... | B23K 3/03 219/241 |
| 4,544,829 A | * | 10/1985 | Adachi .................... | B23K 3/03 219/241 |
| 5,412,178 A | * | 5/1995 | Tamura ................... | B23K 3/033 219/241 |
| 5,837,973 A | * | 11/1998 | Tamura ................ | H05B 1/0213 219/229 |
| 6,215,104 B1 | * | 4/2001 | Kurpiela .............. | B23K 3/0369 219/230 |
| 7,679,032 B2 | * | 3/2010 | Masaki ................ | B23K 3/0353 228/55 |
| 8,274,011 B2 | * | 9/2012 | Masaki ................... | B23K 3/033 219/241 |
| 2006/0022018 A1 | * | 2/2006 | Yoshimura ........... | B23K 3/0361 228/55 |
| 2006/0108345 A1 | * | 5/2006 | Shigekawa .......... | B23K 3/0369 219/229 |

(Continued)

FOREIGN PATENT DOCUMENTS

| CN | 100363138 C | * | 1/2008 | ............. B23K 3/025 |
|---|---|---|---|---|
| CN | 100515642 C | * | 7/2009 | ........... B23K 3/0338 |

(Continued)

*Primary Examiner* — Kiley S Stoner

(57) ABSTRACT

A soldering iron device includes a main body, where an end portion of the main body is provided with a tip, a heating core for heating the tip is provided in the main body, and a measuring element is provided in the main body; and the measuring element includes a mounting rod and a sensor, the sensor is provided on an end portion of the mounting rod, a measuring cavity is formed in the tip, the sensor is inserted into the measuring cavity, and the mounting rod extends toward a direction away from the tip. Compared with the prior art, since the sensor is not provided in the heating core, but is directly inserted into the tip, the present disclosure overcomes the heat transfer distance between the heating core and the tip and directly measures the temperature of the tip, which is highly accurate in measurement and strongly practicable.

4 Claims, 2 Drawing Sheets

(56) References Cited

U.S. PATENT DOCUMENTS

2020/0030902 A1\* 1/2020 Matsuzaki ............. B23K 3/033

FOREIGN PATENT DOCUMENTS

| | | | | | |
|---|---|---|---|---|---|
| CN | 101698262 | A | \* | 4/2010 | ............. B23K 3/025 |
| CN | 104646787 | A | \* | 5/2015 | ............. B23K 3/025 |
| CN | 107283017 | A | \* | 10/2017 | |
| CN | 107442881 | A | \* | 12/2017 | |
| CN | 108637419 | A | \* | 10/2018 | ............... B23K 3/03 |
| CN | 108672871 | A | \* | 10/2018 | |
| CN | 109202207 | A | \* | 1/2019 | ........... B23K 3/0338 |
| CN | 109365946 | A | \* | 2/2019 | ............. B23K 3/033 |
| DE | 4435323 | A1 | \* | 4/1996 | ........... B23K 3/0615 |
| DE | 19605239 | A1 | \* | 8/1996 | ............. B23K 3/033 |
| DE | 202017106517 | U1 | \* | 3/2019 | ............... B23K 3/02 |
| EP | 0351930 | A2 | \* | 1/1990 | |
| JP | 2019171469 | A | \* | 10/2019 | ............. B23K 3/033 |
| KR | 20150051604 | A | \* | 5/2015 | |
| KR | 102217634 | B1 | \* | 2/2021 | |
| KR | 20210083565 | A | \* | 7/2021 | |
| WO | WO-2005056227 | A1 | \* | 6/2005 | ............. B22F 7/064 |
| WO | WO-2005070605 | A1 | \* | 8/2005 | ............. B23K 3/025 |
| WO | WO-2015182487 | A1 | \* | 12/2015 | ............... B23K 3/02 |

\* cited by examiner

SOLDERING IRON DEVICE

CROSS REFERENCE TO RELATED APPLICATIONS

The present application claims the benefit of Chinese Patent Application No. 202122128737.X filed on Sep. 3, 2021, the contents of which are incorporated herein by reference in their entirety.

TECHNICAL FIELD

The present disclosure particularly relates to a soldering iron device.

BACKGROUND

Soldering iron is an indispensable tool for electronic production and electrical appliance maintenance and is mainly used for soldering elements and wires. It includes an electric soldering iron and a stand, and the electric soldering iron includes a tip, a power plug and a switch. When the soldering iron is used, small amounts of soldering tin and rosin are molten on the tip, and the tip and the solder wire are aligned to the solder joint at the same time. Before the flux on the tip is volatilized completely, the tip and the solder wire contact the solder joint at the same time to melt the solder tin. After the solder tin wets the whole solder joint, the tip and the solder wire are removed at the same time or the solder wire is removed first and then the tip is removed upon the round and bright shape of the solder joint. The soldering process preferably lasts for 2-3 s.

The sensor in the prior art is generally used for detecting the real-time temperature of a heating core. However, since the heating core keeps a certain distance from the tip, there exists a temperature difference when the heating core heats the tip, and the sensor detects the real-time temperature of the heating core but not the tip, causing the low measurement accuracy.

SUMMARY

An objective of the present disclosure is to provide a soldering iron device, which can effectively detect a real-time temperature of the tip, and yield a high measurement accuracy.

To achieve the above-mentioned objective, the present disclosure provides a soldering iron device, including a main body, where an end portion of the main body is provided with a tip, a heating core for heating the tip is provided in the main body, and a measuring element is provided in the main body; and the measuring element includes a mounting rod and a sensor, the sensor is provided on an end portion of the mounting rod, a measuring cavity is formed in the tip, the sensor is inserted into the measuring cavity, and the mounting rod extends toward a direction away from the tip.

Compared with the prior art, since the sensor is not provided in the heating core, but is directly inserted into the tip, the present disclosure overcomes the heat transfer distance between the heating core and the tip and directly measures the temperature of the tip, which is highly accurate in measurement and strongly practicable. Meanwhile, with the lengthened mounting rod, the present disclosure makes the sensor mounted more conveniently and optimizes the overall mounting and dismounting of the device.

As an improvement to the above solution, the mounting rod may penetrate inside the heating core, and may be coaxial with the heating core.

As an improvement to the above solution, a mounting cavity may be formed in the main body, one end of the mounting rod may be inserted into the mounting cavity, and the mounting cavity is provided therein with an elastic structure for driving the mounting rod to move toward the tip such that the sensor is tightly pressed on an inner wall of the measuring cavity.

As an improvement to the above solution, the elastic structure may include an elastic element, a fixture piece may be fixed on the mounting rod, the elastic element may be sleeved on the mounting rod, the elastic element may be in a compressed state, one end of the elastic element may abut against the fixture piece, and the other end of the elastic element may abut against an inner wall of the mounting cavity.

As an improvement to the above solution, the elastic element may include a spring.

The present disclosure further has the following beneficial effects:

1. The mounting rod penetrates inside the heating core, and is coaxial with the heating core. It is to be noted that the sleeved structure can optimize the internal structural space of the device and reduce the occupied area of the mounting structure.

2. The elastic structure pushes the mounting rod, such that the sensor can be tightly pressed on the inner wall of the measuring cavity, and the sensor can be tightly attached in the tip, thereby optimizing the overall stability of the sensor during temperature measurement.

DETAILED DESCRIPTION

The technical solutions in the embodiments of the present disclosure will be described below clearly and completely with reference to the accompanying drawings in the embodiments of the present disclosure. Apparently, the embodiments described below are merely part of rather than all embodiments of the present disclosure. All other embodiments obtained by a person of ordinary skill in the art based on the embodiments of the present disclosure without creative efforts shall fall within the protection scope of the present disclosure.

Soldering iron is an indispensable tool for electronic production and electrical appliance maintenance and is mainly used for soldering elements and wires. It includes an electric soldering iron and a stand, and the electric soldering iron includes a tip, a power plug and a switch. When the soldering iron is used, small amounts of soldering tin and rosin are molten on the tip, and the tip and the solder wire are aligned to the solder joint at the same time. Before the flux on the tip is volatilized completely, the tip and the solder wire contact the solder joint at the same time to melt the solder tin. After the solder tin wets the whole solder joint, the tip and the solder wire are removed at the same time or the solder wire is removed first and then the tip is removed upon the round and bright shape of the solder joint. The soldering process preferably lasts for 2-3 s.

Figure 1:
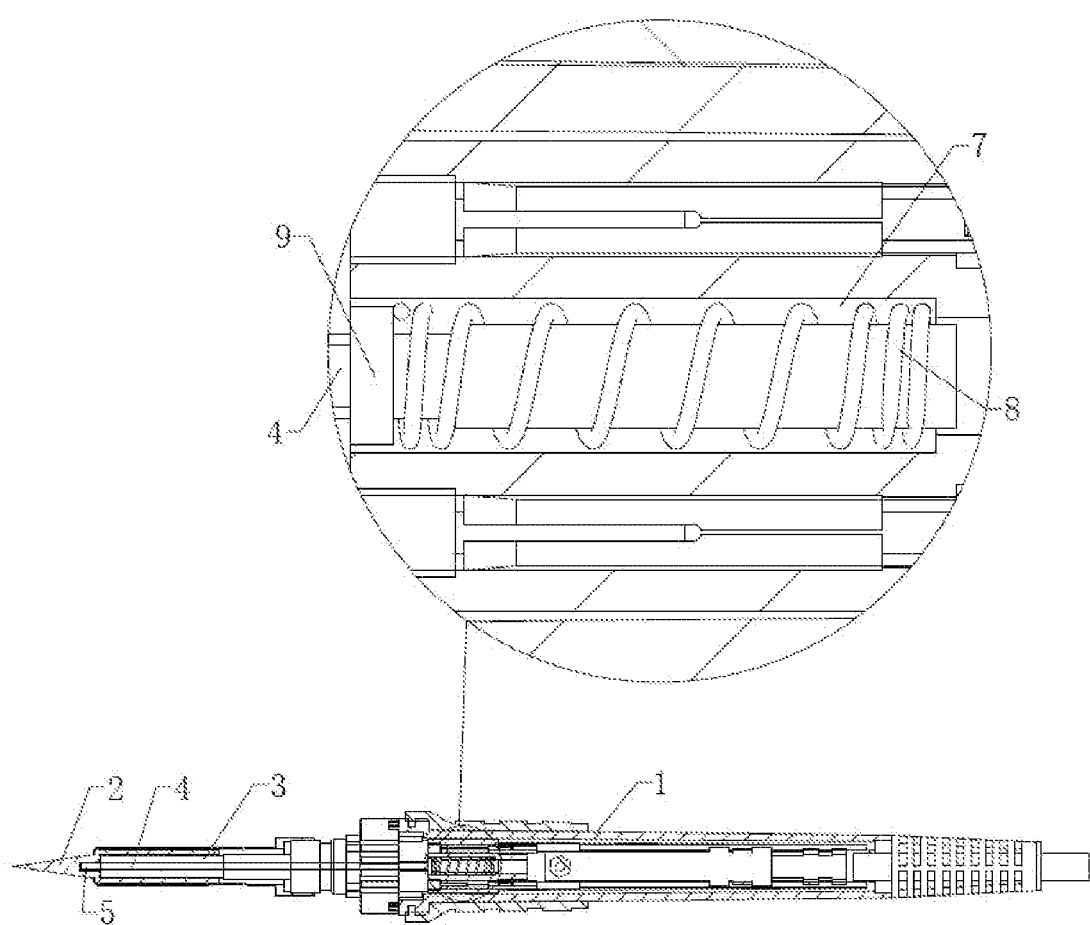
FIG. 1 is a schematic view illustrating a specific structure according to an embodiment of the present disclosure.
Figure 2:
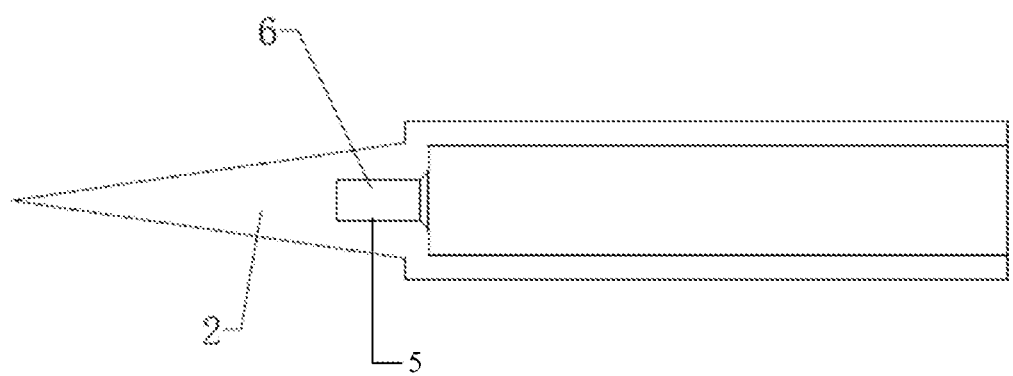
FIG. 2 is a schematic view illustrating a specific structure of a tip according to an embodiment of the present disclosure.

The sensor in the prior art is generally used for detecting the real-time temperature of a heating core. However, since the heating core keeps a certain distance from the tip, there exists a temperature difference when the heating core heats the tip, and the sensor detects the real-time temperature of the heating core but not the tip, causing the low measurement accuracy. In order to overcome the above problem, the present disclosure provides a soldering iron device, with the following specific solution:

Referring to FIG. 1 and FIG. 2, FIG. 1 is a schematic view illustrating a specific structure according to an embodiment of the present disclosure, and FIG. 2 is a schematic view illustrating a specific structure of a tip 2 according to an embodiment of the present disclosure.

A soldering iron device includes a main body 1, where an end portion of the main body 1 is provided with a tip 2, a heating core 3 for heating the tip 2 is provided in the main body 1, and a measuring element is provided in the main body 1.

The measuring element includes a mounting rod 4 and a sensor 5, the sensor 5 is provided on an end portion of the mounting rod 4, a measuring cavity 6 is formed in the tip 2, the sensor 5 is inserted into the measuring cavity 6, and the mounting rod 4 extends toward a direction away from the tip 2.

Exemplarily, in the embodiment, compared with the prior art, since the sensor 5 is not provided in the heating core 3, but is directly inserted into the tip 2, the present disclosure overcomes the heat transfer distance between the heating core 3 and the tip and directly measures the temperature of the tip 2, which is highly accurate in measurement and strongly practicable. Meanwhile, with the lengthened mounting rod 4, the present disclosure makes the sensor 5 mounted more conveniently and optimizes the overall mounting and dismounting of the device.

It is to be noted that the sensor 5 may transmit the signal by a line, and the connecting wire thereof may penetrate through the mounting rod 4 and extend outward for connection.

More preferably, in the embodiment, the mounting rod 4 penetrates inside the heating core 3, and is coaxial with the heating core 3.

It is to be noted that the sleeved structure can optimize the internal structural space of the device and reduce the occupied area of the mounting structure.

More preferably, in the embodiment, a mounting cavity 7 is formed in the main body 1, one end of the mounting rod 4 is inserted into the mounting cavity 7, and the mounting cavity 7 is provided therein with an elastic structure for driving the mounting rod 4 to move toward the tip 2 such that the sensor 5 is tightly pressed on an inner wall of the measuring cavity 6.

It is to be noted that the elastic structure pushes the mounting rod 4, such that the sensor 5 can be tightly pressed on the inner wall of the measuring cavity 6, and the sensor 5 can be tightly attached in the tip 2, thereby optimizing the overall temperature measurement stability of the sensor 5.

More preferably, in the embodiment, the elastic structure includes an elastic element 8, a fixture piece 9 is fixed on the mounting rod 4, the elastic element 8 is sleeved on the mounting rod 4, the elastic element 8 is in a compressed state, one end of the elastic element 8 abuts against the fixture piece 9, and the other end of the elastic element 8 abuts against an inner wall of the mounting cavity 7. In the embodiment, the elastic element 8 includes a spring.

The above descriptions are merely preferred implementations of the present disclosure. It should be noted that the person of ordinary skill in the art may further make several improvements and modifications without departing from the principle of the present disclosure, but such improvements and modifications should be deemed as falling within the protection scope of the present disclosure.

The invention claimed is:

1. A soldering iron device, comprising a main body, wherein an end portion of the main body is provided with a tip, a heating core for heating the tip is provided in the main body, and a measuring element is provided in the main body;

the measuring element comprises a mounting rod and a sensor, the sensor is provided on an end portion of the mounting rod, a measuring cavity is formed in the tip, the sensor is inserted into the measuring cavity, and the mounting rod extends toward a direction away from the tip; and a mounting cavity is formed in the main body, one end of the mounting rod is inserted into the mounting cavity, and the mounting cavity is provided therein with an elastic structure for driving the mounting rod to move toward the tip such that the sensor is pressed on an inner wall of the measuring cavity.

2. The soldering iron device according to claim 1, wherein the mounting rod penetrates inside the heating core, and is coaxial with the heating core.

3. The soldering iron device according to claim 1, wherein the elastic structure comprises an elastic element, a fixture piece is fixed on the mounting rod, the elastic element is sleeved on the mounting rod, the elastic element is in a compressed state, one end of the elastic element abuts against the fixture piece, and the other end of the elastic element abuts against an inner wall of the mounting cavity.

4. The soldering iron device according to claim 3, wherein the elastic element comprises a spring.

* * * * *